(12) United States Patent
Colson et al.

(10) Patent No.: US 10,788,046 B2
(45) Date of Patent: Sep. 29, 2020

(54) FAN AND COMPRESSOR HOUSING FOR AN AIR CYCLE MACHINE

(71) Applicant: Hamilton Sundstrand Corporation, Charlotte, NC (US)

(72) Inventors: Darryl A. Colson, West Suffield, CT (US); Murtuza Lokhandwalla, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/863,468

(22) Filed: Jan. 5, 2018

(65) Prior Publication Data

US 2019/0211842 A1 Jul. 11, 2019

(51) Int. Cl.
*F04D 29/42* (2006.01)
*F04D 29/62* (2006.01)
*B64D 13/06* (2006.01)
*F04D 25/02* (2006.01)
*F01D 25/24* (2006.01)

(52) U.S. Cl.
CPC ......... *F04D 29/4233* (2013.01); *B64D 13/06* (2013.01); *F04D 25/024* (2013.01); *F04D 29/624* (2013.01); *B64D 2013/0648* (2013.01); *F01D 25/24* (2013.01)

(58) Field of Classification Search
CPC .. F04D 29/42; F04D 29/4026; F04D 29/4233; F04D 29/624; F04D 29/181; F04D 29/284; F04D 29/644; B64D 13/02; B64D 13/08; B64D 2013/0648; F01D 5/04; F01D 25/24

USPC ....................................................... 415/213.1
See application file for complete search history.

(56) References Cited

U.S. PATENT DOCUMENTS

| 4,721,313 | A | | 1/1988 | Pennink |
| 5,309,735 | A | * | 5/1994 | Maher, Jr. .............. B64D 13/00 417/406 |
| 6,151,909 | A | | 11/2000 | Carter et al. |

(Continued)

FOREIGN PATENT DOCUMENTS

| CN | 101882817 A | 11/2010 |
| CN | 102221016 A | 10/2011 |

(Continued)

OTHER PUBLICATIONS

First Chinese Office Action for Chinese Patent Application No. 201510398376.7, dated Jul. 2, 2018, 19 pages.

(Continued)

*Primary Examiner* — Richard A Edgar
*Assistant Examiner* — Maranatha Boardman
(74) *Attorney, Agent, or Firm* — Kinney & Lange, P.A.

(57) ABSTRACT

A housing for an air cycle machine includes a first housing portion adjacent a first end of the housing, and a second housing portion adjacent a second end of the housing and attached to the first housing portion. A first duct in the first housing portion is adjacent the first end of the housing with an air inlet and an air outlet. A second duct in the second housing portion is adjacent the second end of the housing with an air inlet and an air outlet. The housing further includes a bolt hole positioned in the second end of the housing, and a rib extending between the first housing portion and the second housing portion. The rib is aligned with the bolt hole.

17 Claims, 9 Drawing Sheets

(56) References Cited

U.S. PATENT DOCUMENTS

| | | |
|---|---|---|
| 8,770,928 B2 | 7/2014 | Chrabascz et al. |
| 9,086,077 B2 * | 7/2015 | Boufflert ................ F04D 29/42 |
| 9,103,568 B2 * | 8/2015 | Beers ........................ F25B 9/06 |
| 9,470,234 B2 | 10/2016 | Rosen et al. |
| 9,546,669 B2 * | 1/2017 | Beers .................... F04D 29/444 |
| 9,790,958 B2 * | 10/2017 | Colson .................. B64D 13/02 |
| 10,113,558 B2 * | 10/2018 | Chrabascz ............ F04D 29/522 |
| 2009/0053051 A1 * | 2/2009 | Cvjeticanin ............ B29C 45/14 |
| | | 415/200 |
| 2011/0164973 A1 * | 7/2011 | Smith ................ F04D 29/4286 |
| | | 415/213.1 |
| 2011/0229313 A1 | 9/2011 | Beers et al. |
| 2012/0195752 A1 * | 8/2012 | Lopez Partida ........ F01D 25/24 |
| | | 415/213.1 |
| 2013/0177399 A1 | 7/2013 | McAuliffe et al. |
| 2013/0287555 A1 * | 10/2013 | Rosen .................... F04D 17/122 |
| | | 415/182.1 |
| 2014/0030080 A1 | 1/2014 | Chrabascz et al. |
| 2014/0199167 A1 * | 7/2014 | Beers .................... F04D 29/444 |
| | | 415/208.3 |
| 2015/0098814 A1 * | 4/2015 | Colson .................. B23P 19/10 |
| | | 415/213.1 |
| 2015/0233386 A1 * | 8/2015 | Beers .................... F04D 25/024 |
| | | 415/111 |
| 2016/0083099 A1 | 3/2016 | Beers et al. |
| 2016/0097401 A1 | 4/2016 | Beers et al. |
| 2016/0281721 A1 | 9/2016 | Army, Jr. et al. |
| 2017/0107993 A1 | 4/2017 | Colson et al. |
| 2017/0191499 A1 | 7/2017 | Chrabascz et al. |
| 2017/0321722 A1 * | 11/2017 | Chrabascz ............. B64D 13/06 |
| 2019/0078468 A1 * | 3/2019 | Haas .................... F01D 11/025 |

FOREIGN PATENT DOCUMENTS

| | | |
|---|---|---|
| CN | 102400942 A | 4/2012 |
| CN | 102562641 A | 7/2012 |
| CN | 102713303 A | 10/2012 |
| CN | 103062130 A | 4/2013 |
| CN | 203109694 U | 8/2013 |
| CN | 103375425 A | 10/2013 |
| CN | 104903587 A | 9/2015 |
| EP | 3073121 A1 | 9/2016 |

OTHER PUBLICATIONS

Second Chinese Office Action for Chinese Patent Application No. 201510398376.7 dated Mar. 4, 2019, 27 pages.

Extended European Search Report for European Patent Application No. 18248280.2, dated May 22, 2019, 7 pages.

* cited by examiner

FAN AND COMPRESSOR HOUSING FOR AN AIR CYCLE MACHINE

BACKGROUND

The present disclosure relates to aircraft environmental control systems. More specifically, the present disclosure relates to a fan and compressor housing for an air cycle machine.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

Air cycle machines typically include rotating components mounted to a tie rod and a static housing surrounding the rotating components. The static housing can include multiple pieces that are fastened together. The static housing pieces need to be able to withstand high pressures, temperatures, and stresses that are transferred to the static housing pieces from the aircraft. Further, one static housing piece will surround a fan blade in the air cycle machine. The static housing piece surrounding the fan blade needs to be able to contain the fan blade in the event the fan blade comes off of a fan rotor hub.

SUMMARY

A housing for an air cycle machine includes a first housing portion adjacent a first end of the housing, and a second housing portion adjacent a second end of the housing and attached to the first housing portion. A first duct in the first housing portion is adjacent the first end of the housing with an air inlet and an air outlet. A second duct in the second housing portion is adjacent the second end of the housing with an air inlet and an air outlet. The housing further includes a bolt hole positioned in the second end of the housing, and a rib extending between the first housing portion and the second housing portion. The rib is aligned with the bolt hole.

A housing for an air cycle machine includes a first housing portion adjacent a first end of the housing, and a second housing portion adjacent a second end of the housing and attached to the first housing portion. A first duct in the first housing portion is adjacent the first end of the housing with an air inlet and an air outlet. A second duct in the second housing portion is adjacent the second end of the housing with an air inlet and an air outlet. The housing further includes a rib extending between and connecting the first housing portion and the second housing portion. There is an opening at a radially inward end of the rib adjacent to the housing.

A housing for an air cycle machine includes a first housing portion adjacent a first end of the housing, and a second housing portion adjacent a second end of the housing and attached to the first housing portion. A first duct in the first housing portion is adjacent the first end of the housing with an air inlet and an air outlet. A second duct in the second housing portion is adjacent the second end of the housing with an air inlet and an air outlet. The housing further includes a bolt hole positioned in the second end of the housing, and a bulged area on the second housing portion. The bulged area is aligned with the bolt hole.

A housing for an air cycle machine includes a first housing portion adjacent a first end of the housing, and a second housing portion adjacent a second end of the housing and attached to the first housing portion. A first duct in the first housing portion is adjacent the first end of the housing with an air inlet and an air outlet. A second duct in the second housing portion is adjacent the second end of the housing with an air inlet and an air outlet. The housing further includes a patch on a radially outer wall of the second housing portion. The patch has an area of increased thickness.

A housing for an air cycle machine includes a first housing portion adjacent a first end of the housing, and a second housing portion adjacent a second end of the housing and attached to the first housing portion. The first housing portion includes a radially outer wall, a curved wall, and a collar. The second housing portion includes a radially outer wall, a curved wall, and a radially inner wall. A first duct in the first housing portion is adjacent the first end of the housing with an air inlet and an air outlet. A second duct in the second housing portion is adjacent the second end of the housing with an air inlet and an air outlet. The curved wall of the first housing portion that a first thickness T1 that is greater than a second thickness T2 of the curved wall of the second housing portion.

DETAILED DESCRIPTION

Figure 1:
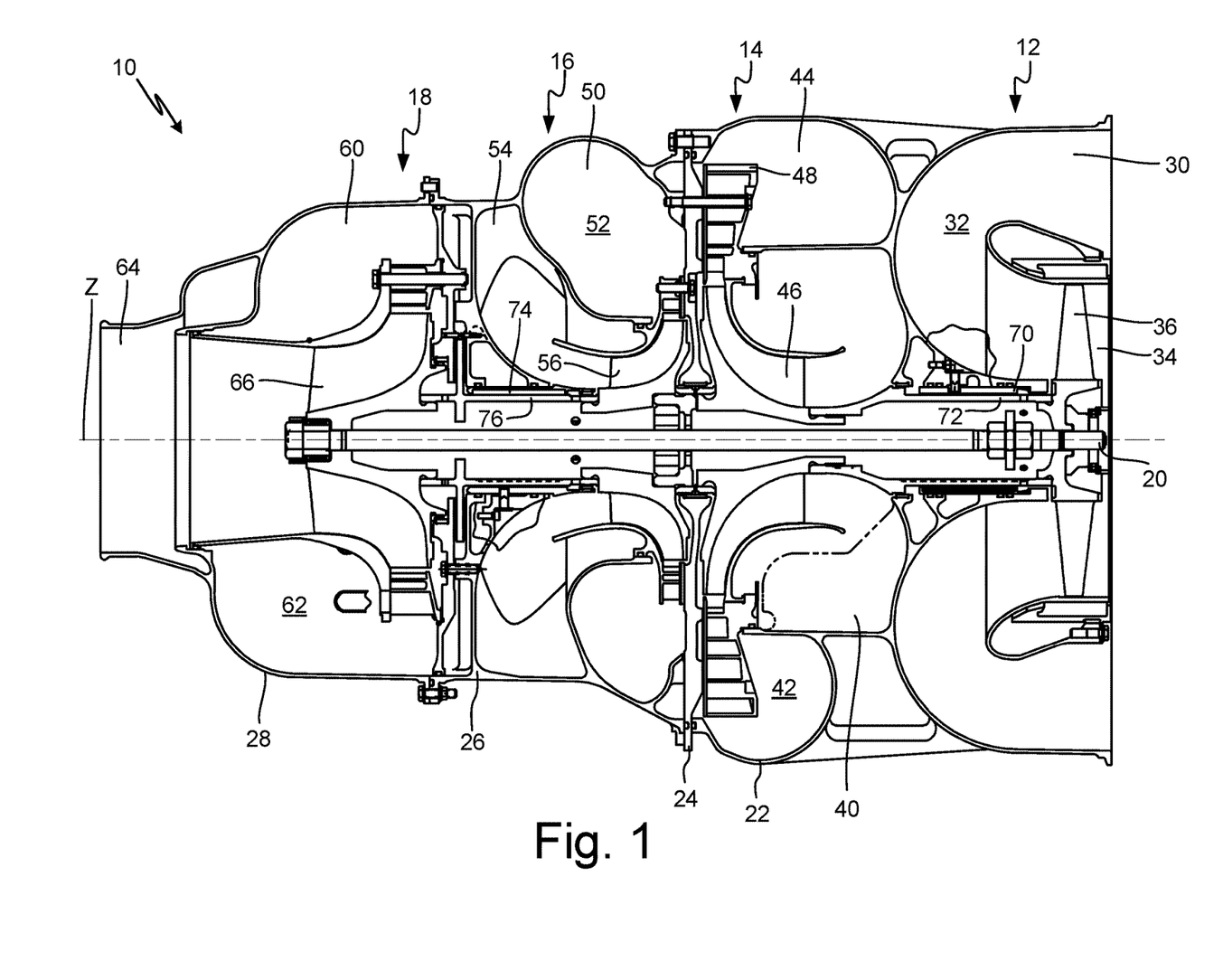
FIG. 1 is a cross-sectional view of an air cycle machine.

FIG. 1 is a cross-sectional view of air cycle machine 10, which includes fan section 12, compressor section 14, first turbine section 16, second turbine section 18, tie rod 20, fan and compressor housing 22, seal plate 24, first turbine housing 26, and second turbine housing 28. Also shown in FIG. 1 is axis Z.

Fan section 12, compressor section 14, first turbine section 16, and second turbine section 18 are all mounted on tie rod 20. Tie rod 20 rotates about axis Z. Fan and compressor housing 22 is connected to seal plate 24 and first turbine housing 26 with fasteners. Seal plate 24 separates flow paths in fan and compressor housing 22 from flow paths in first turbine housing 26. First turbine housing 26 is connected to second turbine housing 28 with fasteners. Fan and compressor housing 22, first turbine housing 26, and second turbine housing 28 together form an overall housing for air cycle machine 10. Fan and compressor housing 22 houses fan section 12 and compressor section 14, first turbine housing 26 housing first turbine section 16, and second turbine housing 28 houses second turbine section 18.

Fan section 12 includes fan inlet 30, fan duct 32, fan outlet 34, and fan rotor 36. Fan section 12 typically draws in ram air from a ram air scoop or alternatively from an associated gas turbine or other aircraft component. Air is drawn into fan inlet 30 and is ducted through fan duct 32 to fan outlet 34. Fan rotor 36 is positioned in fan duct 32 adjacent to fan outlet 34 and is mounted to and rotates with tie rod 20. Fan rotor 36 draws air into fan section 12 to be routed through air cycle machine 10.

Compressor section 14 includes compressor inlet 40, compressor duct 42, compressor outlet 44, compressor rotor 46, and diffuser 48. Air is routed into compressor inlet 40 and is ducted through compressor duct 42 to compressor outlet 44. Compressor rotor 46 and diffuser 48 are positioned in compressor duct 42. Compressor rotor 46 is mounted to and rotates with tie rod 20 to compress the air flowing through compressor duct 42. Diffuser 48 is a static structure through which the compressor air can flow after it has been compressed with compressor rotor 46. Air exiting diffuser 48 can then exit compressor duct 42 through compressor outlet 44.

First turbine section 16 includes first turbine inlet 50, first turbine duct 52, first turbine outlet 54, and first turbine rotor 56. Air is routed into first turbine inlet 50 and is ducted through first turbine duct 52 to first turbine outlet 54. First turbine rotor 56 is positioned in first turbine duct 52 and is mounted to and rotates with tie rod 20. First turbine rotor 56 will extract energy from the air passing through first turbine section 16 to drive rotation of tie rod 20.

Second turbine section 18 includes second turbine inlet 60, second turbine duct 62, second turbine outlet 64, and second turbine rotor 66. Air is routed into second turbine inlet 60 and is ducted through second turbine duct 62 to second turbine outlet 64. Second turbine rotor 66 is positioned in second turbine duct 62 and is mounted to and rotates with tie rod 20. Second turbine rotor 66 will extract energy from the air passing through second turbine section 18 to drive rotation of tie rod 20.

Air cycle machine 10 further includes first journal bearing 70, first rotating shaft 72, second journal bearing 74, and second rotating shaft 76. First journal bearing 70 is positioned in fan section 12 and is supported by fan and compressor housing 22. First rotating shaft 72 extends between and rotates with fan rotor 34 and compressor rotor 44. A radially outer surface of first rotating shaft 72 abuts a radially inner surface of first journal bearing 70. Second journal bearing 74 is positioned in first turbine section 16 and is supported by first turbine housing 26. Second rotating shaft 76 extends between and rotates with first turbine rotor 54 and second turbine rotor 64. A radially outer surface of second rotating shaft 76 abuts a radially inner surface of second journal bearing 74.

Figure 2A:
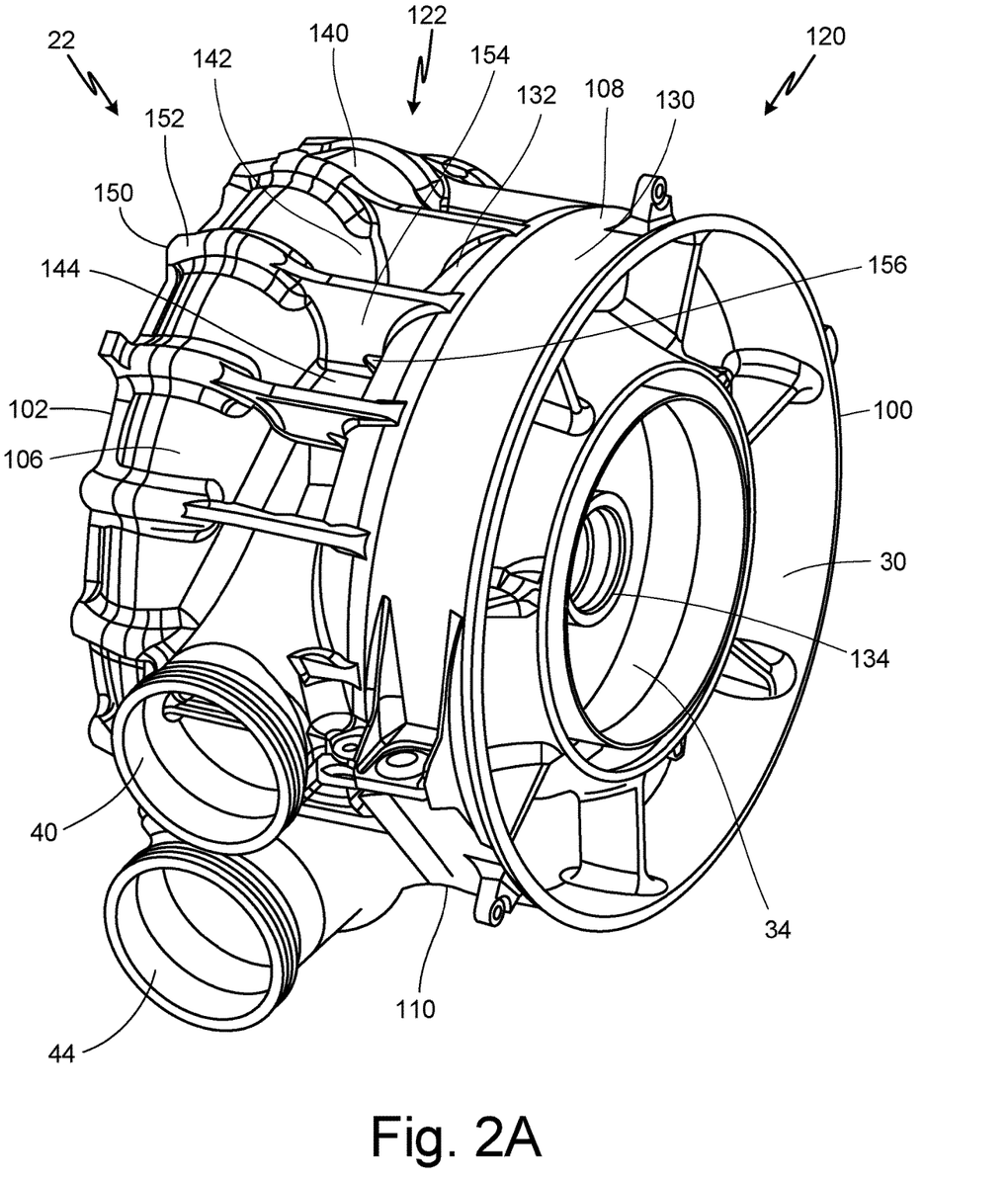
FIG. 2A is an isometric view of a fan and compressor housing.
Figure 2B:
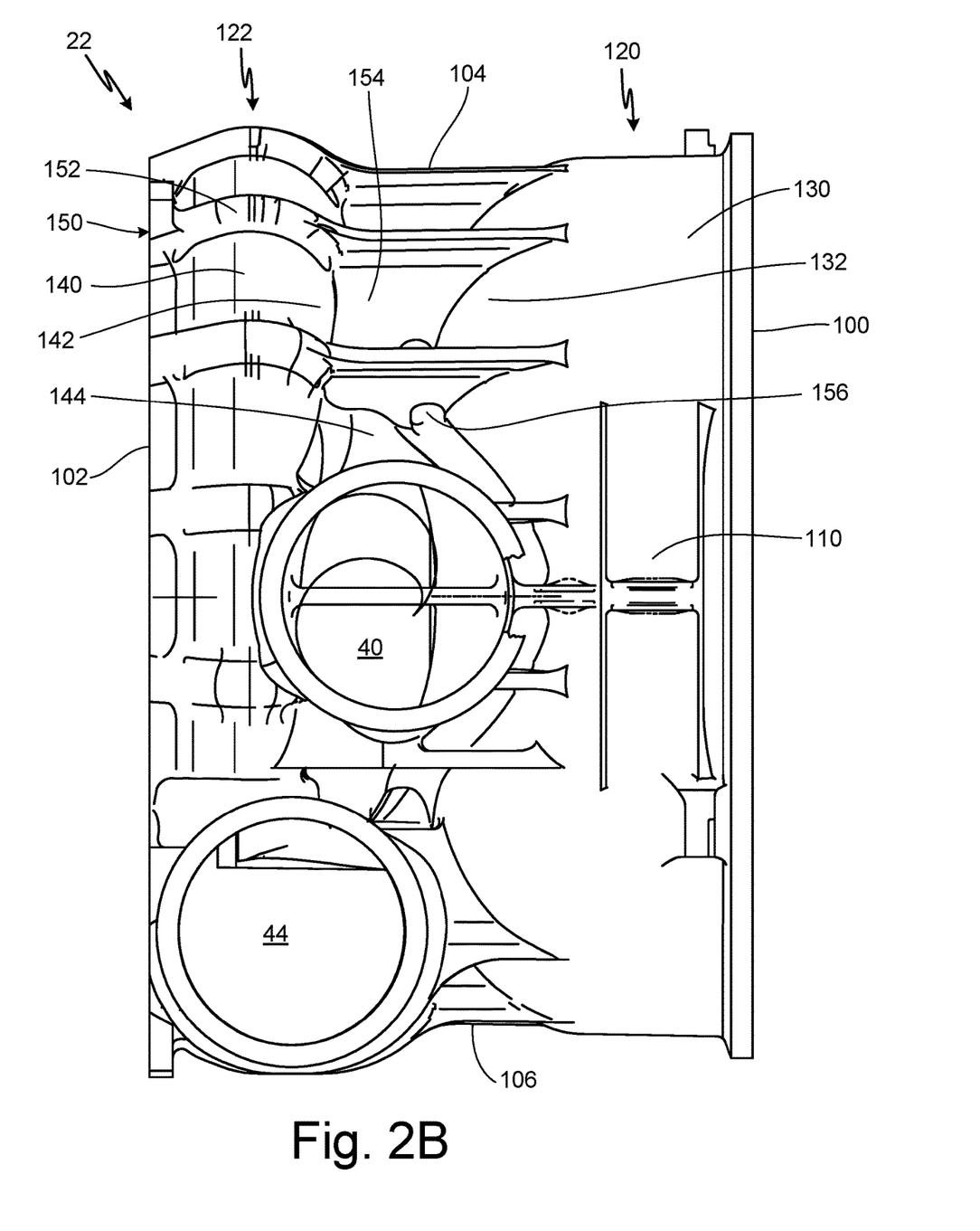
FIG. 2B is a side view of the fan and compressor housing.
Figure 2C:
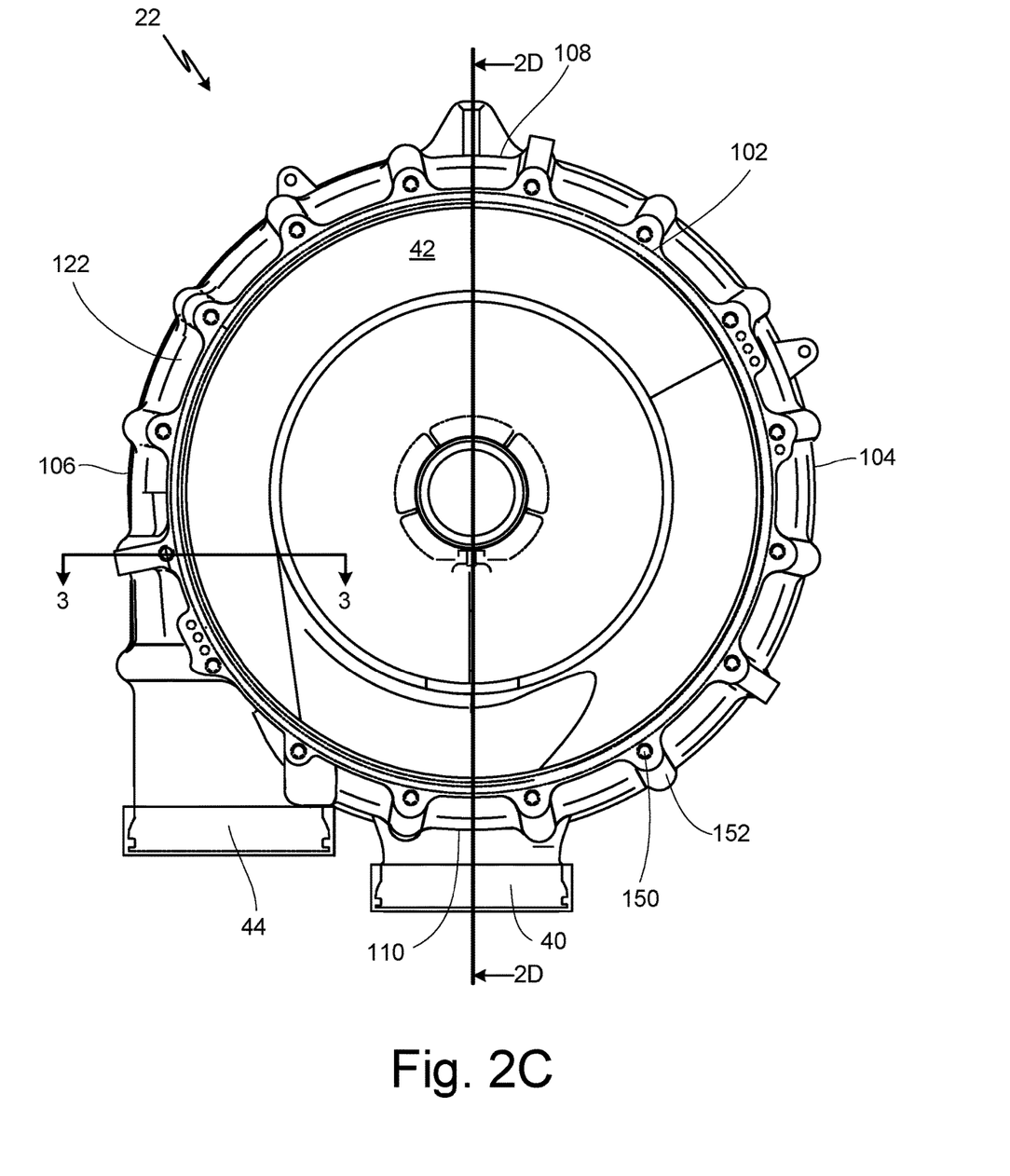
FIG. 2C is a front view of the fan and compressor housing.
Figure 2D:
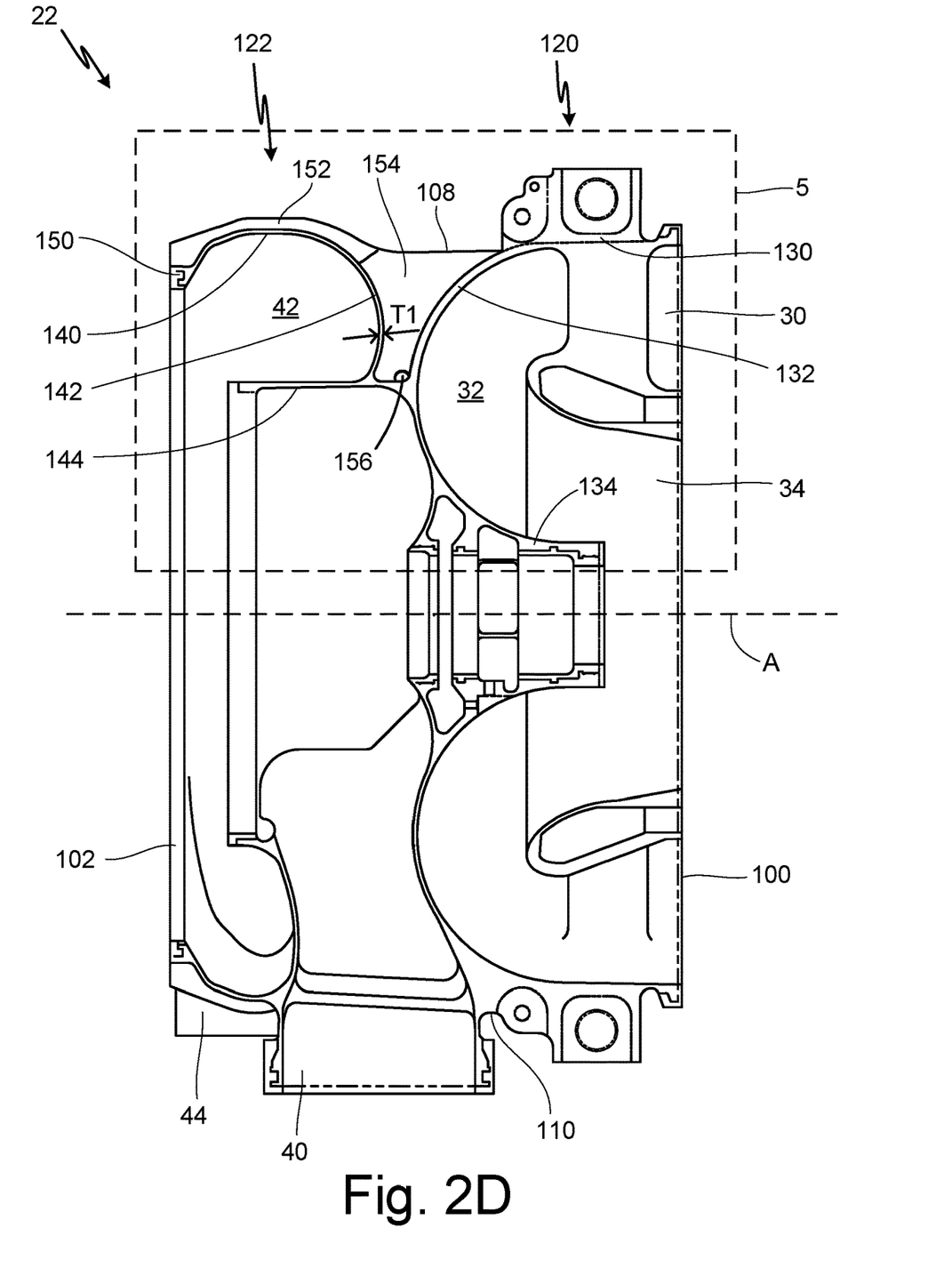
FIG. 2D is a cross-sectional view of the fan and compressor housing taken along line 2D-2D of FIG. 2C.

FIG. 2A is an isometric view of fan and compressor housing 22. FIG. 2B is a front view of fan and compressor housing 22. FIG. 2C is a cross-sectional view of fan and compressor housing 22 taken along line 2C-2C of FIG. 2B. Fan and compressor housing 22 includes fan inlet 30, fan duct 32, fan outlet 34, compressor inlet 40, compressor duct 42, compressor outlet 44, first end 100, second end 102, first side 104, second side 106, third side 108, fourth side 110, fan housing portion 120, compressor housing portion 122, radially outer wall 130, curved wall 132, collar 134, radially outer wall 140, curved wall 142, radially inner wall 144, bolt holes 150, bulged areas 152, ribs 154, and openings 156. FIG. 2D also shows axis A and thickness T1.

Fan and compressor housing 22 is a housing for fan section 12 and compressor section 14 of air cycle machine 10 (as shown in FIG. 1). Fan and compressor housing 22 includes fan inlet 30, fan duct 32, and fan outlet 34 for fan section 12. Fan and compressor housing 22 includes compressor inlet 40, compressor duct 42, and compressor outlet 44 for compressor section 14.

Fan and compressor housing 22 includes first end 100 and second end 102 opposite first end 100. First end 100 and second end 102 are positioned along axis A. First end 100 is an open end of air cycle machine 10 that can be connected to other aircraft components. Second end 102 will be connected to first turbine housing 26 when fan and compressor housing 22 is mounted in air cycle machine 10 (as shown in FIG. 1). Fan and compressor housing 22 further includes first side 104 and second side 106 opposite of first side 104. First side 104 and second side 106 are positioned radially outward from axis A. Fan and compressor housing 22 also includes third side 108 and fourth side 110 opposite of third side 108. Third side 108 is positioned between first side 104 and second side 106, and fourth side 110 is positioned between first side 104 and second side 106. Third side 108 and fourth side 104 are positioned radially outward from axis A.

Fan and compressor housing 22 includes fan housing portion 120 positioned adjacent to first end 100 of fan and compressor housing 22. Fan inlet 30 is positioned at first end 100 in fan housing portion 120 and radially encompasses axis A. Fan inlet 30 can draw air into fan duct 32. Fan duct 32 is a duct extending through fan housing portion 120 of fan and compressor housing 22. Fan duct 32 extends between fan inlet 30 and fan outlet 34. Air that is drawn into fan inlet 30 can flow through fan duct 32 and exit out of fan outlet 34. Fan outlet 34 is also positioned at first end 100 of fan housing portion 120 and radially encompasses axis A.

Fan and compressor housing 22 includes compressor housing portion 122 positioned adjacent to second end 102 of fan and compressor housing 22. Compressor inlet 40 is positioned on fourth side 110 of compressor housing portion 122 adjacent second end 102. Air can flow through compressor inlet 40 into compressor duct 42. Compressor duct 42 is a duct extending through compressor housing portion 122 of fan and compressor housing 22. Compressor duct 42 extends between compressor inlet 40 and compressor outlet 44. Air that flows into compressor inlet 40 can travel through compressor duct 42 and exit out of compressor outlet 44. Compressor outlet 44 is positioned on fourth side 110 of compressor housing section 112 adjacent both second end 102 and compressor inlet 40.

Fan housing portion 120 includes radially outer wall 130, curved wall 132, and collar 134. Radially outer wall 130 forms an outer wall of fan housing portion 120. Curved wall 132 extends from radially outer wall 130 to collar 134. Collar 134 is a radially inner portion of fan housing portion 120. Collar 134 abuts first journal bearing 72, as shown in FIG. 1. Collar 134 mounts fan and compressor housing 22 in air cycle machine 10.

Compressor housing portion 122 includes radially outer wall 140, curved wall 142, and radially inner wall 144. Radially outer wall 140 forms an outer wall of compressor housing portion 122. Curved wall 142 extends from radially outer wall 140 to radially inner wall 144. Radially inner wall 144 is a radially inner portion of compressor housing portion 122. Radially inner wall 144 abuts diffuser 48, as shown in FIG. 1.

Fan and compressor housing 22 includes bolt holes 150 positioned on second end 102. Bolt holes 150 include a flange with an aperture extending through the flange. Bolt holes 150 are used to mounted second end 120 of fan and compressor housing 22 to seal plate 24 and first turbine housing 26 of air cycle machine 10, as shown in FIG. 1. Bulged areas 152 are positioned on radially outer wall 140 of compressor housing portion 122. Bulged areas 152 are aligned with bolt holes 150. Bulged areas 152 are areas of radially outer wall 140 with an increased wall thickness.

Ribs 154 extend between fan housing portion 120 and compressor housing portion 122. Ribs 154 are solid structural ribs with a first side extending along curved wall 132 of fan housing portion 120 and a second side extending along curved wall 142 of compressor housing portion 122. Ribs 154 are aligned with bolt holes 150 and bulged areas 152 of fan and compressor housing 22. There are fifteen ribs 154 on fan and compressor housing 22. Openings 156 are positioned in ribs 154. Openings 156 are positioned at a radially inward end of ribs 154 adjacent to radially inward wall 144 of compressor housing portion 122. There are thirteen openings 156 in ribs 154.

Fan and compressor housing portion 22 includes a general wall thickness for the walls in fan and compressor housing 22. FIG. 2D shows examples of the general wall thickness at thickness T1. These are merely examples of the general wall thickness in fan and compressor housing 22, and the general wall thickness is found at other locations in fan and compressor housing 22. Thickness T1 is between 0.008 inches (0.2032 millimeters) and 0.140 inches (3.556 millimeters).

Fan and compressor housing 22 includes features that are designed to help fan and compressor housing 22 withstand high stresses, pressures, and temperatures. Fan and compressor housing 22 includes bulged areas 152 and ribs 154 to increase the stresses, pressures, and temperatures that fan and compressor housing 22 is capable of withstanding. High stresses, pressures, and temperatures from first turbine housing 26 and seal plate 24 can be transferred into fan and compressor housing 22 at bolt holes 150. Bulged areas 152 extend across radially outer wall 130 of compressor housing portion 122 and are aligned with bolt holes 150 to absorb the higher stresses, pressures, and temperatures being transferred into fan and compressor housing 22 through bolt holes 150.

Further, ribs 154 are aligned with bolt holes 150 and bulged areas 152 to further absorb the higher stresses, pressures, and temperatures being transferred into fan and compressor housing 22 through bolt holes 150. Ribs 154 connect compressor housing portion 122 to fan housing portion 120. Ribs 154 increase the rigidity of fan and compressor housing 22 by connecting compressor housing portion 122 to fan housing portion 120.

Ribs 154 have openings 156 at a radially inward end of ribs 154 adjacent to radially inner wall 144 of compressor housing portion 122. Openings 156 prevent fluids from accumulating on the exterior of fan and compressor housing 22. Fluids that accumulate on the outside of fan and compressor housing 22 drain through the openings 156 and drain off of fan and compressor housing 22 at a bottom of fan and compressor housing 22. The bottom of fan and compressor hosing 22 can vary depending on how air cycle machine 10 is mounted in an aircraft.

Figure 3:
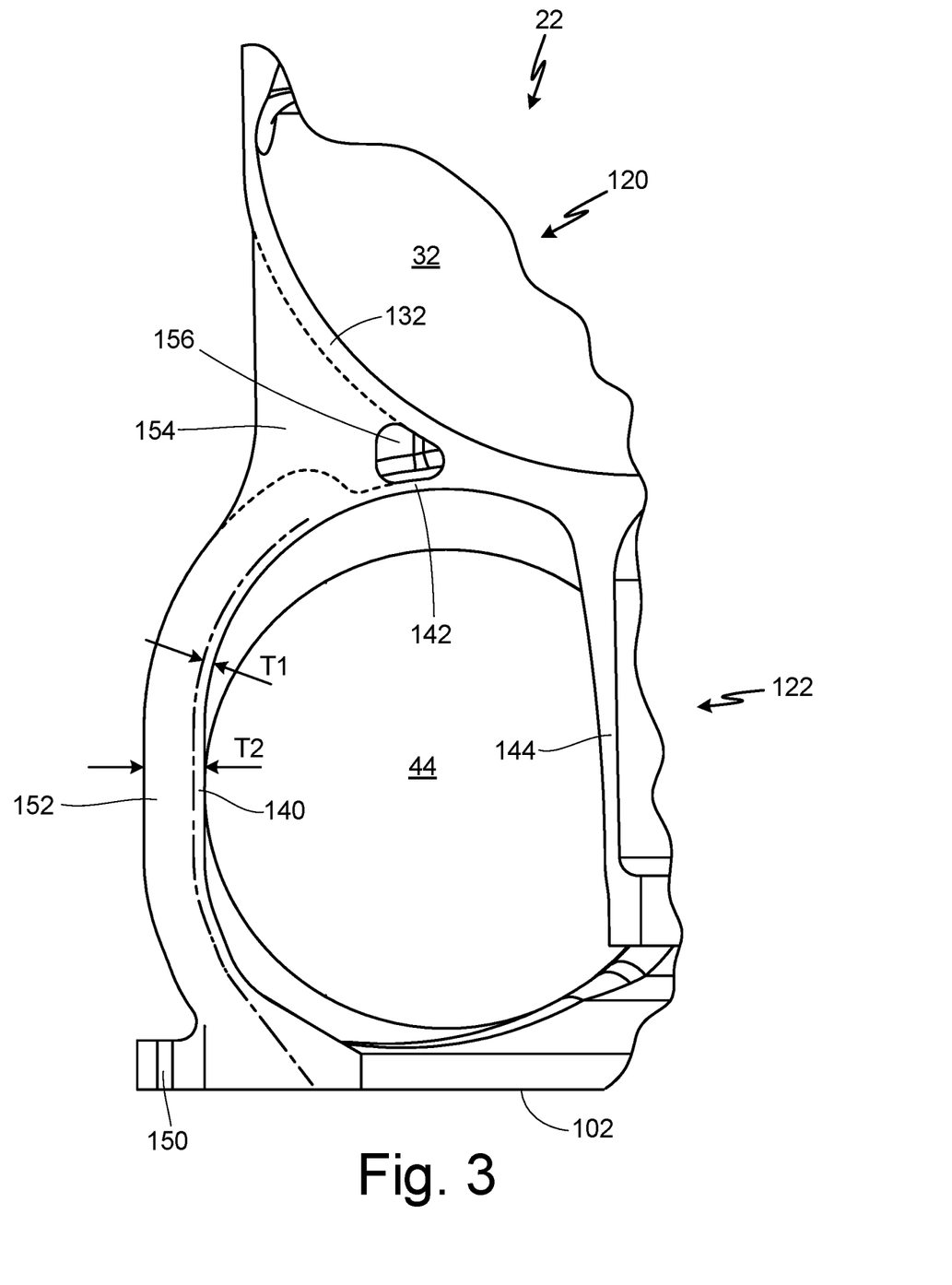
FIG. 3 is a partial cross-section view of a bulged area and a rib on the fan and compressor housing, taken along line 3-3 of FIG. 2C.

FIG. 3 is a partial cross-section view of bulged area 152 and rib 154 on fan and compressor housing 22 taken along line 3-3 of FIG. 2C. Fan and compressor housing portion 22 includes fan duct 32, compressor outlet 44, second end 102, fan housing portion 120, compressor housing portion 122, curved wall 132, radially outer wall 140, curved wall 142, radially inner wall 144, bolt hole 150, bulged area 152, rib 154, and opening 156. FIG. 3 also shows thickness T1 and thickness T2.

Fan and compressor housing 22 has the structure as described in FIGS. 2A-2D. FIG. 3 is a partial cross-sectional view taken through fan duct 32 and compressor outlet 44. FIG. 3 shows fan duct 32 positioned in fan housing portion 120 of fan and compressor housing 22. Fan housing portion 120 has curved wall 132 defining part of fan duct 32. FIG. 3 also shows compressor outlet 44 positioned in compressor housing portion 122 of fan and compressor housing 22. Compressor outlet 44 is adjacent to second end 102 of fan and compressor housing 22. Compressor outlet 44 has radially outer wall 140, curved wall 142, and radially inner wall defining a part of compressor outlet 44.

FIG. 3 shows a cross-sectional view through one bolt hole 150, one bulged area 152, one rib 154, and one opening 156. Bolt hole 150 is positioned on second end 102 of fan and compressor housing 22. Bulged area 152 is positioned on an exterior wall of compressor housing portion 122 of fan and compressor housing 22. Bulged area 152 is aligned with bolt hole 150. Rib 154 is a solid structural rib connecting compressor housing portion 122 to fan housing portion 120. Rib 154 is aligned with bolt hole 150 and bulged area 152 of fan and compressor housing 22. Opening 156 is positioned in rib 154. Opening 156 is positioned at a radially inward end of rib 154 adjacent to radially inner wall 142 of compressor housing 122.

Bulged area 152 is positioned along a radially outer wall of compressor housing portion 122. Bulged area 152 is an area of increased wall thickness in compressor housing portion 122. As shown in FIG. 3, bulged area has a thickness of T2. Thickness T2 is between 0.580 inches (14.732 millimeters) and 0.640 inches (16.256 millimeters). As discussed above in references to FIGS. 2A-2D, fan and compressor housing 22 has a general wall thickness T1 between 0.080 inches (2.032 millimeters) and 0.140 inches (3.556 millimeters). A ratio of thickness T1 to thickness T2 is between 0.1250 and 0.2414.

Bulged areas 152 and ribs 154 help fan and compressor housing 22 withstand higher stresses, pressures, and temperatures. Bulged areas 152 extend across radially outer wall 130 of compressor housing portion 122 and are aligned with bolt holes 150 to absorb the higher stresses, pressures, and temperatures being transferred into fan and compressor housing 22 through bolt holes 150. Bulged areas 152 have an increased wall thickness in order to withstand higher stresses, pressures, and temperatures. Ribs 154 are aligned with bolt holes 150 and bulged areas 152 to further absorb the higher stresses, pressures, and temperatures being transferred into fan and compressor housing 22 through bolt holes 150. Ribs 154 connect compressor housing portion 122 to fan housing portion 120. Ribs 154 increase the rigidity of fan and compressor housing 22 by connecting compressor housing portion 122 to fan housing portion 120.

Ribs 154 have openings 156 at a radially inward end of ribs 154 adjacent to radially inner wall 144 of compressor housing portion 122. Openings 156 prevent fluids from accumulating on the exterior of fan and compressor housing 22. Fluids that accumulate on the outside of fan and compressor housing 22 drain through the openings 156 and drain off of fan and compressor housing 22 at a bottom of fan and compressor housing 22. The bottom of fan and compressor hosing 22 can vary depending on how air cycle machine 10 is mounted in an aircraft.

Figure 4A:
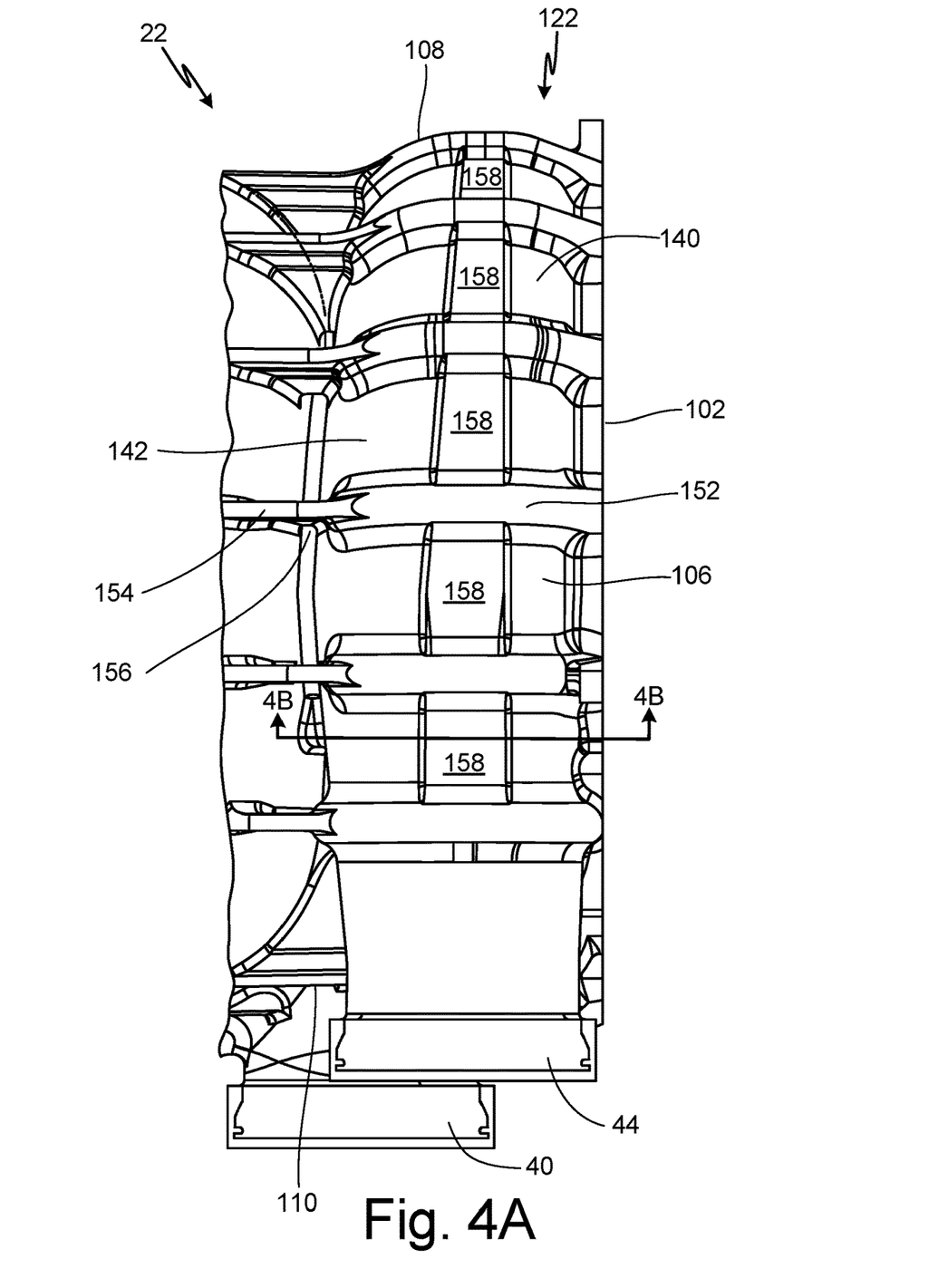
FIG. 4A is a partial side view of a second side of the fan and compressor housing.
Figure 4B:
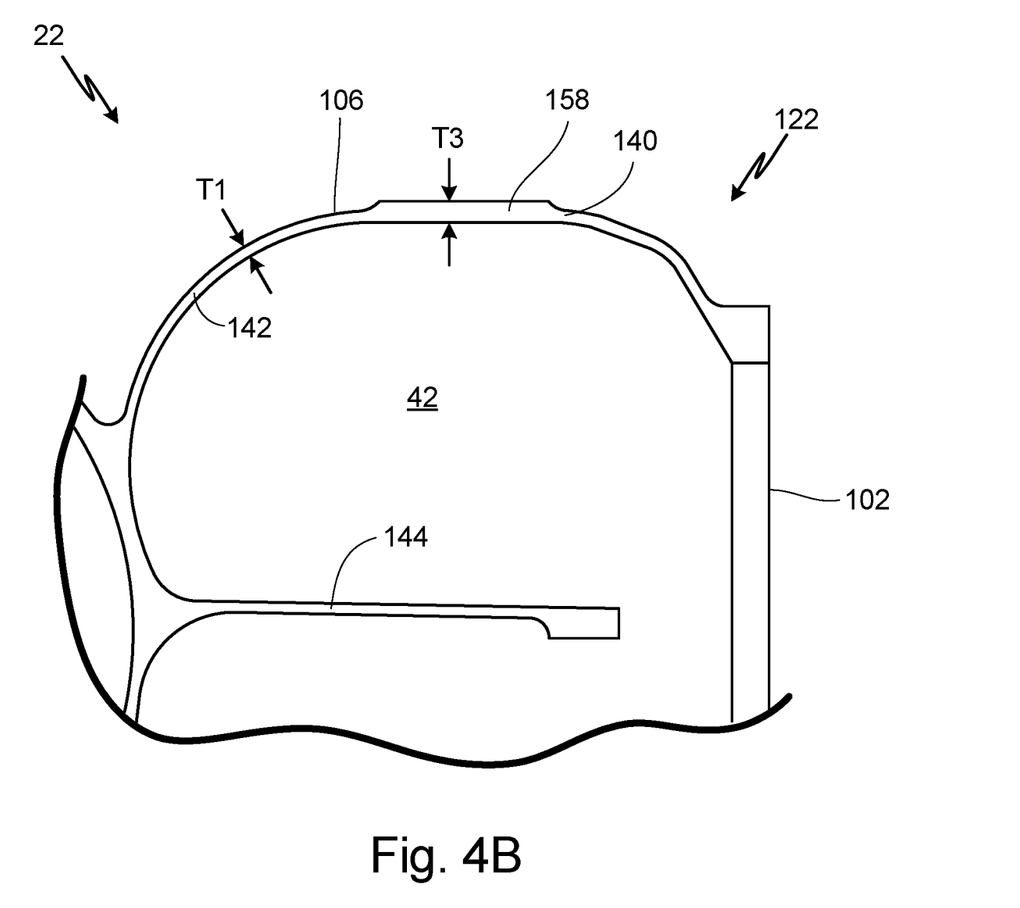
FIG. 4B is a partial cross-sectional view of a patch on the fan and compressor housing, taken along line 5-5 of FIG. 4.

FIG. 4A is a partial side view of second side 106 of fan and compressor housing 22. FIG. 4B is a partial cross-sectional view of patch 158 of fan and compressor housing 22, taken along line 5-5 of FIG. 4. Fan and compressor housing 22 includes compressor inlet 40, compressor duct 42, compressor outlet 44, second end 102, second side 106, third side 108, fourth side 110, compressor housing portion 122, radially outer wall 140, curved wall 142, radially inner wall 144, bulged areas 152, ribs 154, opening 156, and patches 158. FIG. 4B also shows thickness T1 and thickness T3.

Fan and compressor housing 22 has the structure as described in FIGS. 2A-2D. Compressor inlet 40 and compressor outlet 44 are positioned in compressor housing portion 122 adjacent to second end 102 of fan and compressor housing 22. Compressor duct 42 extends through compressor housing portion 122 of fan and compressor housing portion 22 adjacent to second end 102. Compressor duct 42 extends between compressor inlet 40 and compressor outlet 44. FIG. 4A shows second side 106, third side 108, and fourth side 110 of fan and compressor housing 22.

Compressor inlet 40, compressor duct 42, and compressor outlet 44 are positioned in compressor housing portion 122. Compressor housing portion 122 includes radially outer wall 140, curved wall 142, and radially inner wall 144. Radially outer wall 140 forms the outer wall of compressor housing portion 122. Curved wall 142 extends between radially outer wall 140 and radially inner wall 144. Fan and compressor housing 22 shows bulged areas 152, ribs 154, and openings 156, as discussed above in references to FIGS. 2A-3.

Patches 158 are positioned on second side 106 of fan and compressor housing 22. Patches 158 are positioned between bulged areas 152 on radially outer wall 140 of compressor housing portion 122. Fan and compressor housing portion 22 includes five patches 158. Patches 158 are areas of increased wall thickness in radially outer wall 140 of compressor housing portion 122. As shown in FIG. 4B, patch 158 has a thickness T3. Thickness T3 is between 0.175 inches (4.445 millimeters) and 0.235 inches (5.969 millimeters). As discussed above in references to FIGS. 2A-2D, fan and compressor housing 22 has a general wall thickness T1 between 0.080 inches (2.032 millimeters) and 0.140 inches (3.556 millimeters). A ratio of thickness T1 to thickness T3 is between 0.3404 and 0.8000.

Patches 158 are included on fan and compressor housing 22 to help fan and compressor housing 22 withstand higher stresses, pressures, and temperatures. Patches 158 extend across a portion of radially outer wall 140 of compressor housing portion 122 to strengthen radially outer wall 140 of compressor housing portion 122. The increased wall thickness at patches 158 allows fan and compressor housing 22 to withstand higher stresses, pressures, and temperatures.

Figure 5:
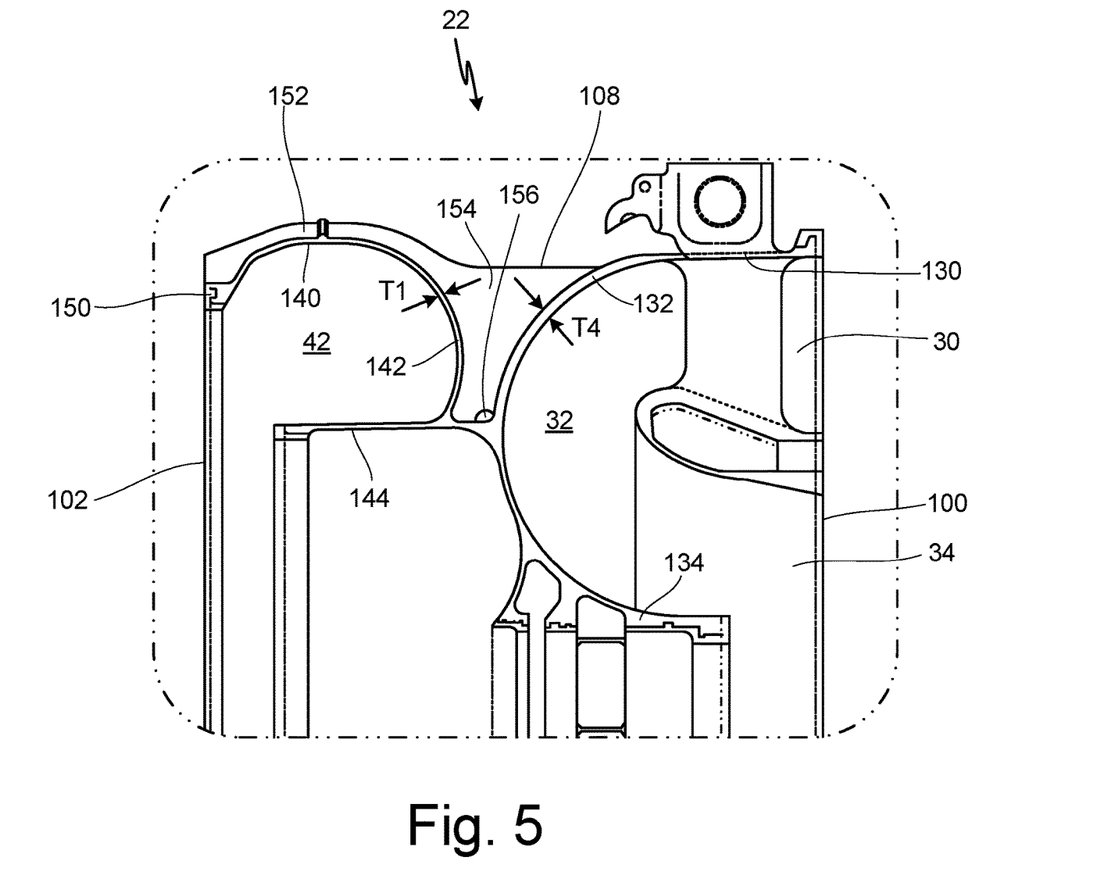
FIG. 5 is an enlarged partial cross-sectional view of the fan and compressor housing, as shown by dashed line 5 in FIG. 2D.

FIG. 5 is an enlarged partial cross-sectional view of fan and compressor housing 22, as shown by dashed line 5 in FIG. 2D. Fan and compressor housing 22 includes fan inlet 30, fan duct 32, fan outlet 34, compressor duct 42, first end 100, second end 102, third side 108, fan housing portion 120, compressor housing portion 122, radially outer wall 130, curved wall 132, collar 134, radially outer wall 140, curved wall 142, radially inner wall 144, bolt hole 120, bulged area 152, rib 154, and opening 156. FIG. 5 also shows thickness T1 and thickness T4.

Fan and compressor housing 22 has the structure as described in FIGS. 2A-2D. Fan inlet 30 and fan outlet 34 are positioned in fan housing portion 120 adjacent to first end 100 of fan and compressor housing 22. Fan duct 32 extends through fan housing portion 120 of fan and compressor housing 22 adjacent to first end 100. Fan duct 32 extends between fan inlet 30 and fan outlet 34. Compressor duct 42 extends through compressor housing portion 122 of fan and compressor housing 22 adjacent to second end 102.

Fan inlet 30, fan duct 32, and fan outlet 34 are positioned in fan housing portion 120. Fan housing portion 120 includes radially outer wall 130, curved wall 132, and radially inner wall 134. Radially outer wall 130 forms the outer wall of fan housing portion 120. Curved wall 132 extends between radially outer wall 130 and collar 134. Compressor duct 42 is positioned in compressor housing portion 120. Compressor housing portion 122 includes radially outer wall 140, curved wall 142, and radially inner wall 144. Radially outer wall 140 forms the outer wall of compressor housing portion 122. Curved wall 142 extends between radially outer wall 140 and radially inner wall 144. Fan and compressor housing 22 shows bulged areas 152, ribs 154, and openings 156, as discussed above in references to FIGS. 2A-3.

Curved wall 132 of fan housing portion 120 has an increased thickness. As shown in FIG. 5, curved wall 132 has a thickness T4. Thickness T4 is between 0.185 inches (4.699 millimeters) and 0.245 inches (6.223 millimeters). As discussed above in references to FIGS. 2A-2D and as shown in FIG. 6, fan and compressor housing 22 has a general wall thickness T1 between 0.080 inches (2.032 millimeters) and 0.140 inches (3.556 millimeters). A ratio of thickness T1 to thickness T3 is between 0.3265 and 0.7568.

Curved wall 132 of fan housing portion 120 has an increased thickness in order to contain fan blades in fan and compressor housing 22. In the event that a fan blade comes off of the fan rotor hub (as shown in FIG. 1), fan housing portion 120 of fan and compressor housing 22 can contain the fan blade. Loose fan blades can cause significant damage to air cycle machine 10 and components in an aircraft that surround air cycle machine 10 if the fan blades go through a wall of fan and compressor housing 22. Increasing the thickness of curved wall 132 of fan housing portion 120 prevents fan blades from going through curved wall 132 and contains the fan blades in fan housing portion 120. This prevents damage to air cycle machine 10 and other components surrounding air cycle machine 10.

Discussion of Possible Embodiments

The following are non-exclusive descriptions of possible embodiments of the present invention.

A housing for an air cycle machine includes a first housing portion adjacent a first end of the housing, and a second housing portion adjacent a second end of the housing and attached to the first housing portion. A first duct in the first housing portion is adjacent the first end of the housing with an air inlet and an air outlet. A second duct in the second housing portion is adjacent the second end of the housing with an air inlet and an air outlet. The housing further includes a bolt hole positioned in the second end of the housing, and a rib extending between the first housing portion and the second housing portion. The rib is aligned with the bolt hole.

The housing of the preceding paragraph can optionally include, additionally and/or alternatively, any one or more of the following features, configurations and/or additional components:

There are fifteen ribs on the housing.

The first housing portion includes a radially outer wall, a curved wall, and a collar, and wherein the second housing portion includes a radially outer wall, a curved wall, and a radially inner wall.

The housing further includes an opening at a radially inward end of the rib.

The opening in the rib is positioned adjacent to the radially inner wall of the second housing portion.

The radially outer wall of the second housing portion has a first thickness T1.

The housing further includes a bulged area on the radially outer wall of the second housing portion, wherein the bulged area has a second thickness T2.

A ratio of the first thickness T1 to the second thickness T2 is between 0.1250 and 0.2414.

The first housing portion is a fan housing portion, and the second housing portion is a compressor housing portion.

An air cycle machine includes a tie rod that is configured to rotate about an axis; a fan section with a fan rotor mounted to the tie rod; a compressor section with a compressor rotor mounted to the tie rod; a first turbine section with a first turbine rotor mounted to the tie rod; a first turbine housing; and a fan and compressor housing comprises the housing as described in any of the preceding paragraphs.

The air cycle machine further includes a second turbine section with a second turbine rotor mounted to the tie rod; and a second turbine housing connected to the first turbine housing.

A housing for an air cycle machine includes a first housing portion adjacent a first end of the housing, and a second housing portion adjacent a second end of the housing and attached to the first housing portion. A first duct in the first housing portion is adjacent the first end of the housing with an air inlet and an air outlet. A second duct in the second housing portion is adjacent the second end of the housing with an air inlet and an air outlet. The housing further includes a rib extending between and connecting the first housing portion and the second housing portion. There is an opening at a radially inward end of the rib adjacent to the housing.

The housing of the preceding paragraph can optionally include, additionally and/or alternatively, any one or more of the following features, configurations and/or additional components:

There are fifteen ribs on the housing.

There are thirteen openings in the ribs in the housing.

The first housing portion includes a radially outer wall, a curved wall, and a collar, and wherein the second housing portion includes a radially outer wall, a curved wall, and a radially inner wall.

The opening in the rib is positioned adjacent to the radially inner wall of the second housing portion.

The radially outer wall of the second housing portion has a first thickness T1.

The housing further includes a bulged area on the radially outer wall of the second housing portion, wherein the bulged area has a second thickness T2.

A ratio of the first thickness T1 to the second thickness T2 is between 0.1250 and 0.2414.

The first housing portion is a fan housing portion, and the second housing portion is a compressor housing portion.

An air cycle machine includes a tie rod that is configured to rotate about an axis; a fan section with a fan rotor mounted to the tie rod; a compressor section with a compressor rotor mounted to the tie rod; a first turbine section with a first turbine rotor mounted to the tie rod; a first turbine housing; and a fan and compressor housing comprises the housing as described in any of the proceeding paragraphs.

The air cycle machine further includes a second turbine section with a second turbine rotor mounted to the tie rod; and a second turbine housing connected to the first turbine housing.

A housing for an air cycle machine includes a first housing portion adjacent a first end of the housing, and a second housing portion adjacent a second end of the housing and attached to the first housing portion. A first duct in the first housing portion is adjacent the first end of the housing with an air inlet and an air outlet. A second duct in the second housing portion is adjacent the second end of the housing with an air inlet and an air outlet. The housing further includes a bolt hole positioned in the second end of the housing, and a bulged area on the second housing portion. The bulged area is aligned with the bolt hole.

The housing of the preceding paragraph can optionally include, additionally and/or alternatively, any one or more of the following features, configurations and/or additional components:

The first housing portion includes a radially outer wall, a curved wall, and a collar, and wherein the second housing portion includes a radially outer wall, a curved wall, and a radially inner wall.

The radially outer wall of the second housing portion has a first thickness T1.

The bulged area has a second thickness T2.

A ratio of the first thickness T1 to the second thickness T2 is between 0.1250 and 0.2414.

The housing further includes a rib extending between the first housing portion and the second housing portion, wherein the rib is aligned with the bolt hole.

The housing further includes an opening at a radially inward end of the rib.

The opening in the rib is positioned adjacent to the radially inner wall of the second housing portion.

The first housing portion is a fan housing portion, and the second housing portion is a compressor housing portion.

An air cycle machine includes a tie rod that is configured to rotate about an axis; a fan section with a fan rotor mounted to the tie rod; a compressor section with a compressor rotor mounted to the tie rod; a first turbine section with a first turbine rotor mounted to the tie rod; a first turbine housing; and a fan and compressor housing comprises the housing of any of the preceding paragraphs.

The air cycle machine further includes a second turbine section with a second turbine rotor mounted to the tie rod; and a second turbine housing connected to the first turbine housing.

A housing for an air cycle machine includes a first housing portion adjacent a first end of the housing, and a second housing portion adjacent a second end of the housing and attached to the first housing portion. A first duct in the first housing portion is adjacent the first end of the housing with an air inlet and an air outlet. A second duct in the second housing portion is adjacent the second end of the housing with an air inlet and an air outlet. The housing further includes a patch on a radially outer wall of the second housing portion. The patch has an area of increased thickness.

The housing of the preceding paragraph can optionally include, additionally and/or alternatively, any one or more of the following features, configurations and/or additional components:

The first housing portion includes a radially outer wall, a curved wall, and a collar, and wherein the second housing portion further includes a curved wall and a radially inner wall.

The housing further includes bulged areas on the radially outer wall of the second housing portion.

The patch is positioned between two bulged areas.

The radially outer wall of the second housing portion has a first thickness T1.

The patch has a second thickness T2.

A ratio of the first thickness T1 to the second thickness T2 is between 0.3404 and 0.8000.

Wherein the first housing portion is a fan housing portion, and the second housing portion is a compressor housing portion.

An air cycle machine includes a tie rod that is configured to rotate about an axis; a fan section with a fan rotor mounted to the tie rod; a compressor section with a compressor rotor mounted to the tie rod; a first turbine section with a first turbine rotor mounted to the tie rod; a first turbine housing; and a fan and compressor housing comprises the housing of any of the preceding paragraphs.

The air cycle machine further includes a second turbine section with a second turbine rotor mounted to the tie rod; and a second turbine housing connected to the first turbine housing.

A housing for an air cycle machine includes a first housing portion adjacent a first end of the housing, and a second housing portion adjacent a second end of the housing and attached to the first housing portion. The first housing portion includes a radially outer wall, a curved wall, and a collar. The second housing portion includes a radially outer wall, a curved wall, and a radially inner wall. A first duct in the first housing portion is adjacent the first end of the housing with an air inlet and an air outlet. A second duct in the second housing portion is adjacent the second end of the housing with an air inlet and an air outlet. The curved wall of the first housing portion that a first thickness T1 that is greater than a second thickness T2 of the curved wall of the second housing portion.

The housing of the preceding paragraph can optionally include, additionally and/or alternatively, any one or more of the following features, configurations and/or additional components:

A ratio of the second thickness T2 to the first thickness T1 is between 0.3265 and 0.7568.

The first housing portion is a fan housing portion, and the second housing portion is a compressor housing portion.

An air cycle machine includes a tie rod that is configured to rotate about an axis; a fan section with a fan rotor mounted to the tie rod; a compressor section with a compressor rotor mounted to the tie rod; a first turbine section with a first turbine rotor mounted to the tie rod; a first turbine housing; and a fan and compressor housing comprises the housing of any of the preceding paragraphs.

The air cycle machine further includes a second turbine section with a second turbine rotor mounted to the tie rod; and a second turbine housing connected to the first turbine housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A housing for an air cycle machine, the housing comprising:
    a first housing portion adjacent a first end of the housing;
    a second housing portion adjacent a second end of the housing and attached to the first housing portion;
    a first duct in the first housing portion adjacent the first end of the housing with an air inlet and an air outlet;
    a second duct in the second housing portion adjacent the second end of the housing with an air inlet and an air outlet;
    a bolt hole positioned in the second end of the housing;
    a rib extending between the first housing portion and the second housing portion, wherein the rib is aligned with the bolt hole; and
    a bulged area on the second housing portion, wherein the bulged area is aligned with the bolt hole and the rib, wherein the bulged area is on a radially outer wall of the second housing portion, wherein the radially outer wall of the second housing portion has a first thickness T1, wherein the bulged area has a second thickness T2, and wherein a ratio of the first thickness T1 to the second thickness T2 is between 0.1250 and 0.2414.

2. The housing of claim 1, wherein there are fifteen ribs on the housing.

3. The housing of claim 1, wherein the first housing portion includes a radially outer wall, a curved wall, and a collar, and wherein the second housing portion includes the radially outer wall, a curved wall, and a radially inner wall.

4. The housing of claim 3, and further comprising:
    an opening at a radially inward end of the rib positioned adjacent to the radially inner wall of the second housing portion.

5. The housing of claim 1, wherein the first housing portion is a fan housing portion, and the second housing portion is a compressor housing portion.

6. An air cycle machine comprising:
    a tie rod that is configured to rotate about an axis;
    a fan section with a fan rotor mounted to the tie rod;
    a compressor section with a compressor rotor mounted to the tie rod;
    a first turbine section with a first turbine rotor mounted to the tie rod;
    a first turbine housing; and
    a fan and compressor housing comprising the housing of claim 1.

7. A housing for an air cycle machine, the housing comprising:
    a first housing portion adjacent a first end of the housing;
    a second housing portion adjacent a second end of the housing and attached to the first housing portion;
    a first duct in the first housing portion adjacent the first end of the housing with an air inlet and an air outlet;
    a second duct in the second housing portion adjacent the second end of the housing with an air inlet and an air outlet;

a rib extending between and connecting the first housing portion and the second housing portion, wherein there is an opening at a radially inward end of the rib adjacent to the housing; and a bulged area on the second housing portion, wherein the bulged area is aligned with the rib, wherein the bulged area is on a radially outer wall of the second housing portion, wherein the radially outer wall of the second housing portion has a first thickness T1, wherein the bulged area has a second thickness T2, and wherein a ratio of the first thickness T1 to the second thickness T2 is between 0.1250 and 0.2414.

8. The housing of claim 7, wherein there are thirteen openings in the ribs in the housing.

9. The housing of claim 7, wherein the first housing portion includes a radially outer wall, a curved wall, and a collar, and wherein the second housing portion includes the radially outer wall, a curved wall, and a radially inner wall.

10. The housing of claim 9, wherein the opening in the rib is positioned adjacent to the radially inner wall of the second housing portion.

11. The housing of claim 7, wherein the first housing portion is a fan housing portion, and the second housing portion is a compressor housing portion.

12. An air cycle machine comprising:
a tie rod that is configured to rotate about an axis;
a fan section with a fan rotor mounted to the tie rod;
a compressor section with a compressor rotor mounted to the tie rod;
a first turbine section with a first turbine rotor mounted to the tie rod;
a first turbine housing; and
a fan and compressor housing comprising the housing of claim 7.

13. A housing for an air cycle machine, the housing comprising:
a first housing portion adjacent a first end of the housing;
a second housing portion adjacent a second end of the housing and attached to the first housing portion;
a first duct in the first housing portion adjacent the first end of the housing with an air inlet and an air outlet;
a second duct in the second housing portion adjacent the second end of the housing with an air inlet and an air outlet;
a bolt hole positioned in the second end of the housing; and
a bulged area on the second housing portion, wherein the bulged area is aligned with the bolt hole, wherein a radially outer wall of the second housing portion has a first thickness T1, wherein the bulged area has a second thickness T2, and wherein a ratio of the first thickness T1 to the second thickness T2 is between 0.1250 and 0.2414.

14. The housing of claim 13, wherein the first housing portion includes a radially outer wall, a curved wall, and a collar, and wherein the second housing portion includes the radially outer wall, a curved wall, and a radially inner wall.

15. The housing of claim 14, and further comprising:
a rib extending between the first housing portion and the second housing portion, wherein the rib is aligned with the bolt hole; and
an opening at a radially inward end of the rib, wherein the opening in the rib is positioned adjacent to the radially inner wall of the second housing portion.

16. The housing of claim 14, wherein the first housing portion is a fan housing portion, and the second housing portion is a compressor housing portion.

17. An air cycle machine comprising:
a tie rod that is configured to rotate about an axis;
a fan section with a fan rotor mounted to the tie rod;
a compressor section with a compressor rotor mounted to the tie rod;
a first turbine section with a first turbine rotor mounted to the tie rod;
a first turbine housing; and
a fan and compressor housing comprising the housing of claim 13.

\* \* \* \* \*